United States Patent [19]

Hopkins

[11] 4,124,328

[45] Nov. 7, 1978

[54] INDEXABLE INSERT DRILL

[75] Inventor: David Alan Hopkins, Detroit, Mich.

[73] Assignee: The Valeron Corporation, Oak Park, Mich.

[21] Appl. No.: 789,354

[22] Filed: Apr. 21, 1977

[51] Int. Cl.² .............................................. B23B 51/00
[52] U.S. Cl. .................. 408/223; 408/199; 408/705; 408/713
[58] Field of Search ............... 408/231, 199, 238, 186, 408/705, 211, 713, 239, 240, 223

[56] References Cited

U.S. PATENT DOCUMENTS

| 3,540,323 | 11/1970 | Rishel | 408/186 |
|---|---|---|---|
| 3,791,001 | 2/1974 | Bennett | 407/114 |
| 3,816,018 | 6/1974 | Hlocky | 408/238 |
| 3,963,365 | 6/1976 | Shallenberger, Jr. | 408/199 |
| 4,047,826 | 9/1977 | Bennett | 408/199 |

*Primary Examiner*—Harrison L. Hinson

[57] ABSTRACT

An indexable insert drill employing a pair of radially opposed inserts having either positive or negative axial lead cutting edges extending in the same cone of revolution. One of the inserts has a radially inner arcuate corner intersecting and extending across the axial center line. The other insert is located relatively overlapping but outward radially with an outermost corner adapted to finish cut the side wall diameter of the hole. Insert cutting edges provide for chip interruption and breakage.

19 Claims, 11 Drawing Figures

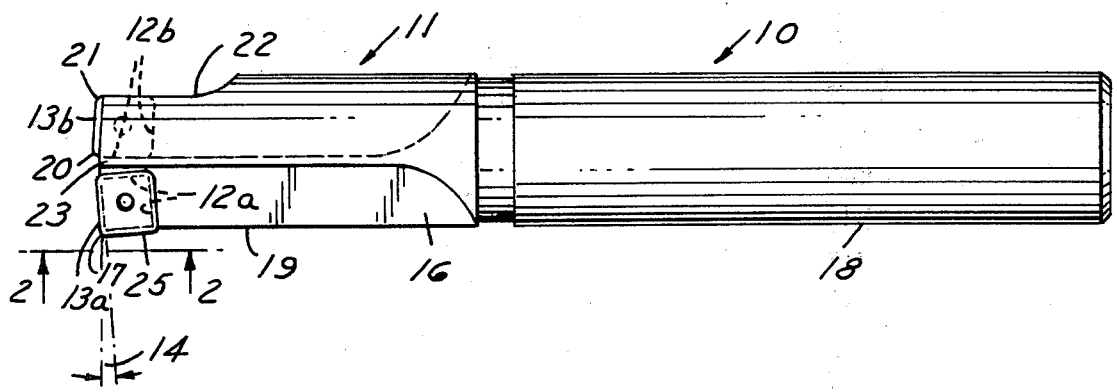
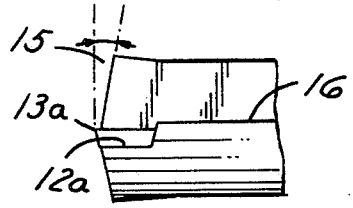
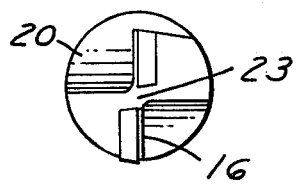
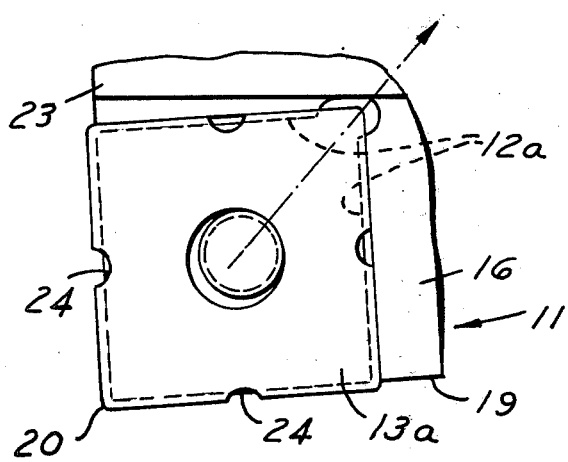
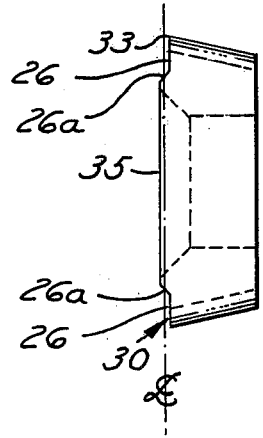
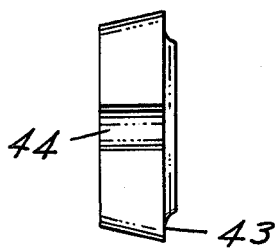
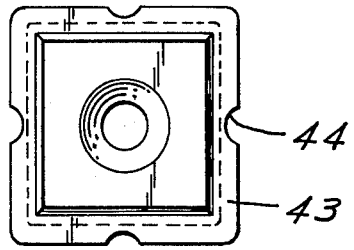

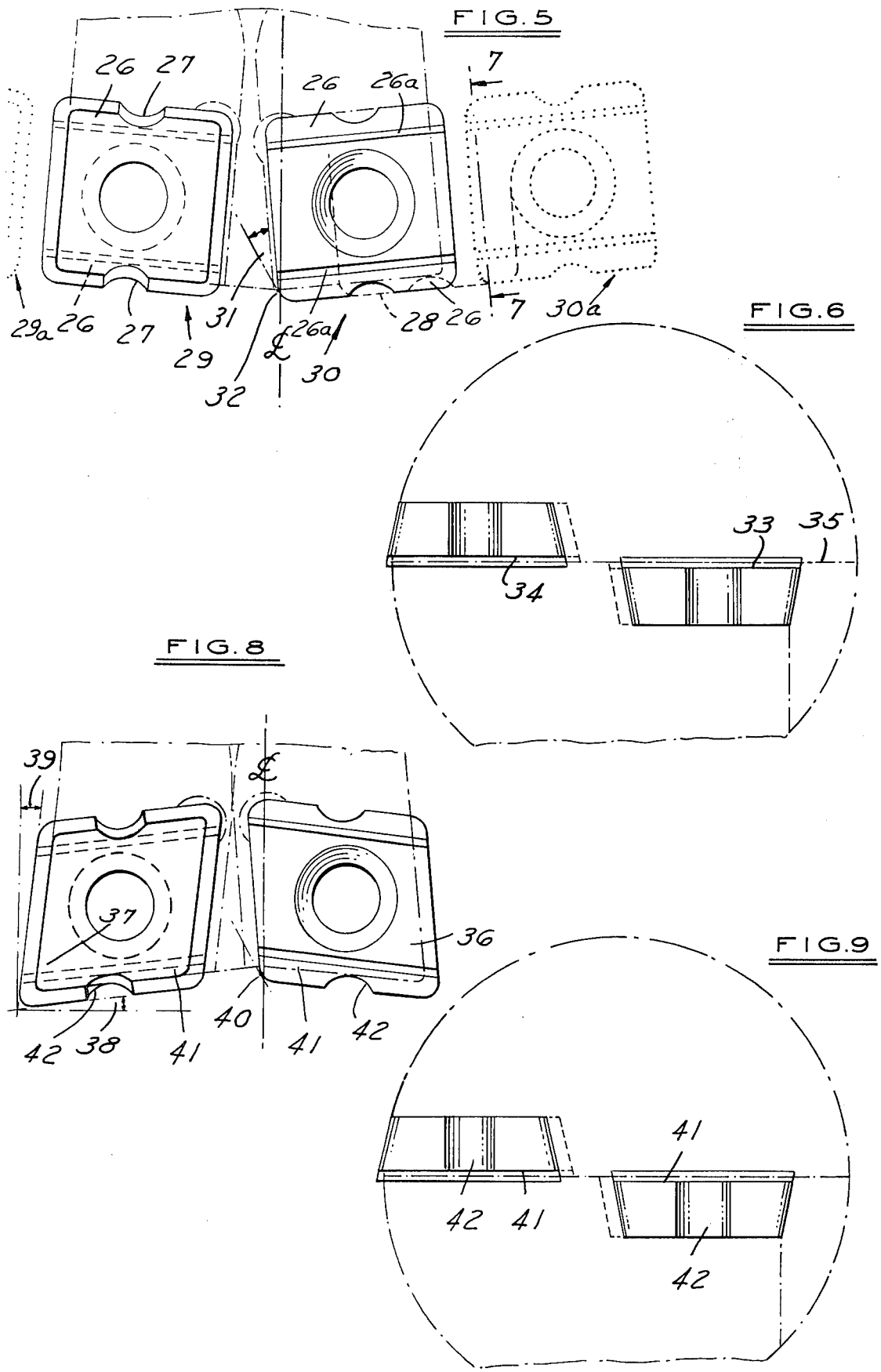

INDEXABLE INSERT DRILL

BACKGROUND OF THE INVENTION

A center cutting end mill has been previously developed as disclosed in U.S. Pat. No. 3,938,231 wherein square inserts are positioned with zero axial lead angle for axial plunge cutting or for radial feed. In one of the forms disclosed a pair of radially opposed inserts is employed, one of which is located with its inner arcuate corner extending across the center axis of the end mill to provide center cutting action while the other relatively outward insert finished the side wall surface in an axial plunge cut and provides the leading cutting edge for a radial feed cut.

While such end mill may be employed for limited depth axial plunging it is not entirely satisfactory for through drilling normal to the workpiece outer surface where the cutting edges would break out simultaneously over the entire end wall of the hole. Furthermore, the absence of any positive lead angle for axial cutting limits lateral stability for fast deep drilling operations and entire side edge contact of the outermost insert with the hole bore leads to chatter and undesirable wear in drilling depths exceeding the diameter of the cutter.

The prior art also includes indexable insert drills of the type shown in U.S. Pat. Nos. 3,540,323 and 3,963,365 which employ a pair of square inserts each having eight indexable cutting edges positioned so that the active lead cutting edge of one cuts the inner half while the other cuts the outer half of the hole. A negative lead angle on the inner insert and positive lead angle on the outer result in the lead corners of both inserts substantially coinciding at a radius of about one-half the drill radius. Lead angles in the order of 15° to 45° are employed. The straight cutting edge of the inner insert extends across center and in the latter patent, an improved version of the former, the lead corner of the inner insert extends axially ahead of the corresponding corner of the outer insert. The latter patent also teaches the necessity or desirability of providing one or more hard wear strips on the periphery of the drill body to cause the drill to advance in a substantially straight line and prevent the drill body from rubbing against and being worn by the peripheral surface of the hole. Such requirement would appear to be due at least in part to the use of a positive axial lead angle on the outer insert combined with a negative axial lead angle on the inner insert located in diametrically opposed relation so that reactive cutting forces normal to the cutting edge of both inserts would tend to deflect or subject the drill to forces having a component in the same direction toward one side of the drill.

SUMMARY OF THE PRESENT INVENTION

It has been found possible according to the present invention to provide an indexable insert drill of use in drilling hole depths as great as 3 to 3½ times drill diameter which are clean, smooth and straight without relying on wear strips or shank surface contact with the hole wall for drill guidance. A pair of inserts are employed having only slight but identical lead angles in the range of 0° to 5°, which may be either positive or negative, the cutting edges of which sweep through a common cone of revolution with one radially inner insert having an arcuate corner intersected by the drill axis and the other radially overlapping outer insert having an outer arcuate corner establishing the outer cutter periphery and the diameter of the drilled hole. Axial side clearance is provided by having the outer insert cutting corner project beyond the shank diameter and, in the case of positive axial lead angle, through the use of square inserts; or in the case of negative axial lead angle, through the use of diamond shaped inserts. In either case the inserts may be positioned with zero radial and axial rake angle and adequate positive side wall clearance angle; or the insert which cuts the center portion of the hole may be positioned with a positive axial rake using an insert with suitable side clearance, or negative axial rake using a typical negative insert, while the overlapping insert which cuts the hole diameter may be arranged in any of the advantageous axial and radial rake angle combinations determined by the material to be drilled and its relative machineability. Chip interruption and breakage are provided by an interruption at the center of each cutting edge as well as a chip breaking groove extending along the cutting edge.

DESCRIPTION OF THE DRAWINGS

FIG. 1 is a side elevation of an indexable insert drill in accordance with the present invention;

FIG. 2 is a similar fragmentary side elevation rotated 90°;

FIG. 3 is an end view of the drill;

FIG. 4 is an enlarged face view of a typical insert employed in the drill;

FIG. 5 is an enlarged schematic layout of a pair of inserts showing their relationship as adapted for a positive lead installation viewed in side elevation;

FIG. 6 is a schematic end view of the insert shown in FIG. 5;

FIG. 7 is a side view of one of the inserts taken along the line 7—7 of FIG. 5;

FIG. 8 is an enlarged schematic layout view of a pair of diamond inserts adapted for installation in a negative lead form of the drill;

FIG. 9 is an end view of the inserts shown in FIG. 8;

FIG. 10 is a face view of a square insert having a modified construction for four index positions; and FIG. 11 is a side view of the insert shown in FIG. 10.

DESCRIPTION OF THE PREFERRED EMBODIMENTS

With reference to FIG. 1 the drill comprises a shank 10 having a double straight fluted end 11 with a pair of insert pockets 12a, 12b each having a recessed bottom surface and two side walls for locating a pair of identical indexable inserts 13 made of sintered tungsten carbide or other wear resistant material. In the illustrated embodiment the pockets are adapted to locate the inserts with a slight positive lead angle 14 in the order of 3°, and with neutral axial and radial rake angles. As shown in the FIG. 2 fragmentary view of the fluted end 11, rotated 90° from FIG. 1 on the axis of the drill, the nose is provided with clearance angles 15 in the order of 11° to match the side clearance angle of each insert. The recess for chip flow extends directly back from the insert pocket along a flat surface 16, extending slightly below the cutting face of the insert.

With reference again to FIG. 1, the radially outermost insert 13a has a cutting corner 17 projecting radially outside of the shank surface 18 and reduced fluted end diameter 19 to establish the cutting diameter of the drill, while the radially innermost insert 13b has an arcuate corner 20 which extends across the center axis of the drill with a tangent to the arc at the point of intersection forming a preferred angle with the axis of approximately 30°. The outermost corner 21 of the insert 13b lies inside the hole diameter and the end of the drill is relieved at 22 to provide additional chip clearance. The radially outward position of the insert 13a provides space for a structural web 23 extending between the respective inserts as also shown in the end view of FIG. 3.

The enlarged view of the insert face in FIG. 4 corresponding to the outer insert 13a in FIG. 1 shows notch interruptions 24 in the respective four cutting edges of each insert which serve to interrupt and narrow the width of the dual chips cut by each cutting edge relative to the single chip which result in the absence of such notches. The relative radial displacement of the respective inner and outer inserts provides an overlap of effective cutting edge of each insert for the interrupted cutting edge of the other insert so that full cutting action from center to outer perimeter results from the combined action of the two inserts with a substantially balanced chip loading for each of the inserts.

The slight positive lead angle for the outer insert 13a will be seen to provide effective side clearance for the inactive cutting edge 25 so that a boring action is simulated as distinguished from the prior art referred to above or conventional drills where side edges or wear strips engage the wall of the drill hole. Nevertheless it has been found that the centering action of the innermost insert in starting the center cut of a hole in solid material together with a substantially balanced chip loading which avoids eccentric or lateral combined cutting forces permit accurately straight holes with smooth bored hole finishes to be drilled rapidly and without chatter.

Referring to FIGS. 5, 6, and 7 a modified form of positive lead square insert is illustrated wherein two indexable cutting edges are provided for each insert, which may employed in pairs as illustrated in full line or with aligned additional inserts for larger diameter drilling as illustrated in phantom at 29a and 30a, each insert having a chip breaking groove 26 as well as an interruption 27 in the cutting edge corresponding to the interruptions 24 as shown in FIG. 4 embodiment. In FIG. 5 the radial overlap illustrated by the dotted line representation 28 of the radially outermost insert 29 relative to the center cutting insert 30 provides effective cutting action throughout the hole diameter. In the enlarged scale of FIG. 5 the tangent angle of 30° is clearly shown at 31 and it will be understood that the slight conical projection 32 at the axis of the drill where zero velocity of the cutting edge occurs will provide little resistance for pressure on the cutting edge at such point which might otherwise tend to fracture the edge of a brittle insert such as tungsten carbide. As shown in FIG. 6 the respective cutting edges 33 and 34 in this embodiment are located slightly behind the center line 35. The chip breaking groove 26 terminates at a back wall 26a forming an obtuse angle of approximately 135°. In a typical one inch diameter drill employing ⅜ inch square inserts, a groove 0.010 inch deep extending 0.050 inch from cutting edge 33 to back wall 26 a provides effective cutting action.

Referring to FIGS. 8 and 9 a further modification for negative lead angle cutting is illustrated wherein 80° corner diamond inserts 36 and 37 are arranged to provide 5° negative lead angle as shown at 38 to ease breakout in through hole drilling together with 5° back clearance 39 with the cutting action at the center again providing a 30° tangent relationship with the axis of the cutting edge as shown at 40. While the negative lead angle of the inserts project chips outwardly against the hole wall in the workpiece, the slight angle together with the chip breakage and interruption provided by grooves 41 and cutting edge interruptions 42 minimize the effect of such chip flow on the workpiece and facilitate chip passage through the fluted passage of the drill, especially with coolant flow which may be provided by conventional means through the tool.

Referring to FIGS. 10 and 11 a further modification of the insert is illustrated having four index positions in a square insert for use in the positive lead angle version of the drill with chip breaking grooves 43 and interruptions 44 in the cutting edge provided for each of the four index positions.

While each of the illustrated embodiments discloses neutral axial and radial rake angles it will be understood, as mentioned at the beginning of the specification, that an axial rake may be provided for the center cutting insert and any desired combination of positive or negative axial and radial rake angles for the overlapping insert which cuts the hole diameter as may be appropriate for the material being drilled and its relative machineability. It is preferable, however, that the radial rake angle of the insert which cuts the center portion of the hole be provided with neutral radial geometry to insure that a line along the end cutting edge of the insert intersect and cross the rotational axis of the drill.

Lead angles in the range of 2° to 5° are recommended with a 3° angle preferred for the positive lead versions of the drill employing square inserts, and a negative lead angle from 0° to 9° may be employed for negative lead angle versions. While an 80° diamond is preferred for negative lead drills it is also possible to employ a triangular insert or any diamond shape within the range of 55° to 90°.

I claim:
1. An indexable insert drill comprising: a shank; a pair of pockets at one end of said shank, each formed for locating an indexable polygonal insert; one of said pockets having means for locating a first insert with a cutting edge extending from the center of said drill obliquely to a transverse plane normal to the drill axis, with an inactive radially innermost edge, and with an inactive edge joining a radially outermost inactive bridging corner of said cutting edge; said other pocket having means for locating a second insert radially outward relative to said first insert with a cutting edge extending obliquely to a transverse plane normal to the drill axis equally and oppositely to said first insert cutting edge in the same cone of revolution and with its radially outermost corner providing the radially outermost cutting element joining an inactive radially outermost edge.

2. An indexable insert drill as set forth in claim 1 including inserts wherein said cutting edge of each insert is interrupted to provide chip interruption.

3. An indexable insert drill as set forth in claim 2 including inserts wherein the interruptions of the respective inserts overlap in relative radial dimension to provide substantially continuous combined radial cutting action.

4. An indexable insert drill as set forth in claim 3 including inserts wherein said cutting edge of each insert is provided with a chip breaker groove extending along the edge.

5. An indexable insert drill as set forth in claim 4 including inserts wherein said cutting edge of each insert is provided with a chip breaker groove extending along the edge, said groove extending in the order of 50 thousandths of an inch in an axial direction.

6. An indexable insert drill as set forth in claim 4 including inserts wherein said cutting edge of each insert is provided with a chip breaker groove extending along the edge, said groove extending in the order of fifty thousandths of an inch in an axial direction, and said groove having a depth of in the order of 10 thousandths of an inch.

7. An indexable insert drill as set forth in claim 4 including inserts wherein said cutting edge of each insert is provided with a chip breaker groove extending along the edge, said groove extending in the order of 50 thousandths of an inch in an axial direction, and said groove having a depth of in the order of ten thousandths of an inch with a back wall providing an obtuse angle in the order of 135°.

8. An indexable insert drill as set forth in claim 1 including inserts each having side walls projecting from the indexable edges with a positive clearance angle in the order of 11°.

9. An indexable insert drill as set forth in claim 1 including inserts wherein each of said pockets positions its insert with neutral axial and radial rake angles.

10. An indexable insert drill as set forth in claim 1 wherein said oblique angle provides a positive center lead.

11. An indexable insert drill as set forth in claim 10 including inserts wherein each insert has a square face configuration with arcuate corners.

12. An indexable insert drill as set forth in claim 1 wherein said oblique angle is adapted to provide a negative radially outer lead.

13. An indexable insert drill as set forth in claim 12 including inserts wherein said cutting edge and radially outer adjacent edge of at least said other insert is formed with an acute corner angle.

14. An indexable insert drill as set forth in claim 12 including inserts wherein at least said other insert is formed with a diamond faced configuration.

15. An indexable insert drill as set forth in claim 12 including inserts wherein said cutting edge and radially outer adjacent edge of at least said other insert is formed with an acute corner angle within the range of 55° to 90°.

16. An indexable insert drill as set forth in claim 12 including inserts wherein said cutting edge and radially outer adjacent edge of at least said other insert is formed with an acute corner angle in the order of 80°.

17. An indexable insert drill as set forth in claim 12 including inserts wherein said cutting edge and radially outer adjacent edge of at least said other insert is formed with an acute face angle, and wherein the radially outer edge adjacent said corner cutting element is provided with an axial clearance angle within a range of 0° to 9°.

18. An indexable insert drill as set forth in claim 12 including inserts wherein at least said other insert is formed with a diamond faced configuration, and wherein the radially outer edge adjacent said corner cutting element is provided with an axial clearance angle within a range of 0° to 9°.

19. An indexable insert drill as set forth in claim 1 wherein said one of said pockets includes means for locating said insert with the axis of said drill intersecting an intermediate bridging corner joining said cutting edge and said inactive radially intermost edge.

* * * * *